(12) United States Patent
Keith et al.

(10) Patent No.: US 6,874,833 B2
(45) Date of Patent: Apr. 5, 2005

(54) PICKUP TOOL WITH VARIABLE POSITION LIMITING AND VARIABLE AXIS OF OPERATION

(76) Inventors: Glen S. Keith, 1207 Westport Rd., San Marcos, CA (US) 92069; Philip L. Rappl, 12241 Eastbourne Rd., San Diego, CA (US) 92128

( * ) Notice: Subject to any disclaimer, the term of this patent is extended or adjusted under 35 U.S.C. 154(b) by 0 days.

(21) Appl. No.: 10/365,035

(22) Filed: Feb. 11, 2003

(65) Prior Publication Data

US 2004/0135387 A1 Jul. 15, 2004

Related U.S. Application Data

(63) Continuation-in-part of application No. 10/340,142, filed on Jan. 10, 2003, now abandoned.

(51) Int. Cl.[7] ................................................. B25J 1/00
(52) U.S. Cl. ..................................... 294/19.1; 294/115
(58) Field of Search .............................. 294/19.1, 19.2, 294/19.3, 22, 23, 24, 50.8, 50.9, 100, 115; 81/53.11, 53.12

(56) References Cited

U.S. PATENT DOCUMENTS

| | | | |
|---|---|---|---|
| 3,527,492 A | | 9/1970 | Hollis |
| 4,483,562 A | * | 11/1984 | Schoolman ................ 294/19.1 |
| 4,709,839 A | | 12/1987 | Tucker |
| 4,962,957 A | | 10/1990 | Traber |
| 5,577,785 A | * | 11/1996 | Traber et al. ............... 294/19.1 |
| 5,590,923 A | * | 1/1997 | Berger et al. ............... 294/19.1 |
| 6,227,584 B1 | * | 5/2001 | Reuther ...................... 294/19.1 |
| 6,513,844 B1 | * | 2/2003 | Hsu .......................... 294/19.1 |

* cited by examiner

Primary Examiner—Dean J. Kramer
(74) Attorney, Agent, or Firm—Murphey & Murphey, A.P.C.

(57) ABSTRACT

A hand-held tool, for grasping items located at a distance from the operator, including a tool body, including a handle extending therefrom, for holding by the operator, and a moveable trigger operably arranged with the handle, at least one movable, pickup finger, for aid in grasping an item in response to squeezing the trigger, a first, elongated, rigid member, attached between the tool body and the at least one moveable finger, for holding the tool body and the at least one moveable finger, in a spaced-apart arrangement, a second, flexible member attached between the trigger and the at least one moveable finger, for moving the finger in response to movement of the trigger, a lockable element, a loosely-arranged binding plate, moveable by the thumb of the hand holding the handle, arranged for movement against the lockable element for permitting infinite locking positions of the at least one movable finger against the item grasped by the finger, and, a socket formed in the tool body for receiving the first, rigid, elongated member, the first, elongated, rigid member being adapted to be pulled out of the socket and be turned in any arrangement about the elongated, rigid member's central axis, for operating the attached at least one moveable finger, in any plane with the plane of the handle.

30 Claims, 5 Drawing Sheets

PICKUP TOOL WITH VARIABLE POSITION LIMITING AND VARIABLE AXIS OF OPERATION

RELATED U.S. PATENT APPLICATION

This Patent Application is a Continuation-in-Part of our earlier filed Patent Application of the same title, filed Jan. 10, 2003, given Ser. No. 10/340,142 now abandoned.

BACKGROUND OF THE INVENTION

1. Field of the Invention

This invention pertains to the field of hand tools. More particularly, it pertains to tools for undertaking manipulative operations spaced apart from the operator's hands, including picking up and moving objects from one place to another, with movable, pickup fingers. These tools are generally known as "reachers" or "grabbers." This invention pertains to such tools having the novel property of infinitely variable position limiting of the moveable fingers and of having the ability of varying the plane of operation of the fingers.

2. Description of the Prior Art

There are situations where items are not within reach and physical barriers, such as limbs of trees, drain grates, furniture and the like, prevent one from grasping and/or retrieving or moving certain items. In these situations one often depends upon tools with grasping actions, spaced apart from the handle, to reach through the physical barriers. Such tools come in a variety of sizes, lengths, and internal mechanisms. As our daily lives become more complex with crowded living conditions and an aging population, these tools take on a more meaningful existence.

Especially with the older generation, reaching and retrieving out-of-reach items is becoming more important. In some instances, persons can use grabbers to retrieve bottles from high shelves, or crowded items from heavily stocked cabinets, however, many people do not have long term grasping power in their hands to retain a grip sufficient to grasp the item and continue to hold it while moving it from one place to another. Such a lack of gripping power usually results in the item being dropped as it is moved.

Reachers and grabbers remedy this situation. Prior art U.S. Pat. No. 3,527,492 discloses such a tool for use in picking up trash or other items, comprising an elongated shaft having a handle at one end, with a squeezable trigger, and a pair of spring-operated, spaced-apart, pick-up fingers located at the opposite end of the shaft.

U.S. Pat. No. 4,709,839 discloses a somewhat similar tool containing a shoe horn and an abutment attached to a moveable portion at the lower end of the shaft, for aiding a person in putting on and taking off their shoes. In both of these devices, however, the pressure exerted against the object to be captured by the tool comes directly from the continuing pressure of the operator's hand squeezing the trigger.

U.S. Pat. No. 4,962,957 concerns a pickup tool with a positional locking device which includes an arm outwardly-extending from the handle and containing spaced-apart notches to which a pin may be locked to hold the pickup fingers in one of two or three separate locking positions. This tool, as well as the other tools mentioned herein, is confined to having the spaced-apart, pickup fingers aligned along an axis transverse to the plane of the handle.

A shortcoming in the prior art is the fact that all available pickup tools, such as reachers and grabbers, have a fixed axis along which the pickup fingers operate. If someone wishes to have the fingers travel along a path different from the path transverse to the plane of the handle, they must rotate the handle to a different orientation. Some persons do not have the dexterity to do this or do not have much strength in their hands. These people are adversely affected by such a frozen design in the pickup tool. A pickup tool with an infinitely variable pickup finger positioning ability, and/or a pickup tool with the ability to rotate the plane of the moveable fingers to a different angle, is currently not available.

SUMMARY OF THE INVENTION

This invention is a hand-held, pickup tool having the novel feature of infinitely variable position limiting of the moveable, pickup fingers, from fully opened to fully closed, and all positions in between. Another novel feature is the ability to rotate the shaft on which the moveable, pickup fingers are mounted, so that the fingers may move along planes other than transverse to the plane of the handle.

The invention includes a non-symmetrical, curved, lockable element, preferably having a plurality of serrated indentations, uniquely positioned inside the tool body and arranged to move along a non-symmetrical, curvilinear path as an attached trigger is squeezed. A binding plate is also uniquely mounted inside the tool body for interacting with the lockable element and a pivotally-mounted actuator means held loosely in connection to the binding plate. When the actuator means is pivoted in one direction, it causes the binding plate to lock against the lockable element, preferably by sliding within the serrated indentations, thus, permitting the trigger to lock in a specific position, and permitting the attached moveable, pickup fingers to lock against an object. The tool can then be used to move the object without continuing to squeeze the trigger against the handle. The fingers' grasp against the object is easily unlocked when the trigger is slightly over-squeezed. The slight over-squeezing of the trigger causes the binding plate to unlock its position against the lockable bar, allowing the actuator, with the aid of a torque spring, to spring back to its original position, and allows the trigger to move back to its original position, and the fingers to release their grasp against the object and move back to their original position.

The tool body includes a socket in which the elongated shaft of the tool is partially removably inserted. When it is necessary to change the plane of the fingers, the shaft can be temporarily pulled loose from the socket, and rotated, clockwise or counter-clockwise, 90°, 180°, 270° or 360° and repositioned in the socket to accomplish the change in the plane.

Accordingly, the main object of this invention is an elongated, pickup tool having an infinitely variable position limiting the fingers from fully opened to fully closed, and all positions in between. Other objects of the invention include an elongated, pickup tool that can easily be altered to have the fingers move along a plane that is different from the plane of the handle; a tool where all the position-related and finger-locking elements reside inside the tool itself; a tool where the locking elements can easily be positioned from a locking position to their original, unlocked position; a tool where the position of the locking fingers is infinitely variable; a tool where the rotation of the plane along which the fingers move can be accomplished without external tools; a tool where the elongated shaft is self-aligning; and a tool that may be used by men, women and children who are either right-handed or left-handed.

These and other objects of the invention will become more apparent when reading the description of the preferred embodiment along with the drawings that are appended hereto. The protection sought by the inventor may be gleaned from a fair reading of the claims that conclude the specification.

DESCRIPTION OF THE PREFERRED EMBODIMENT

Figure 1:
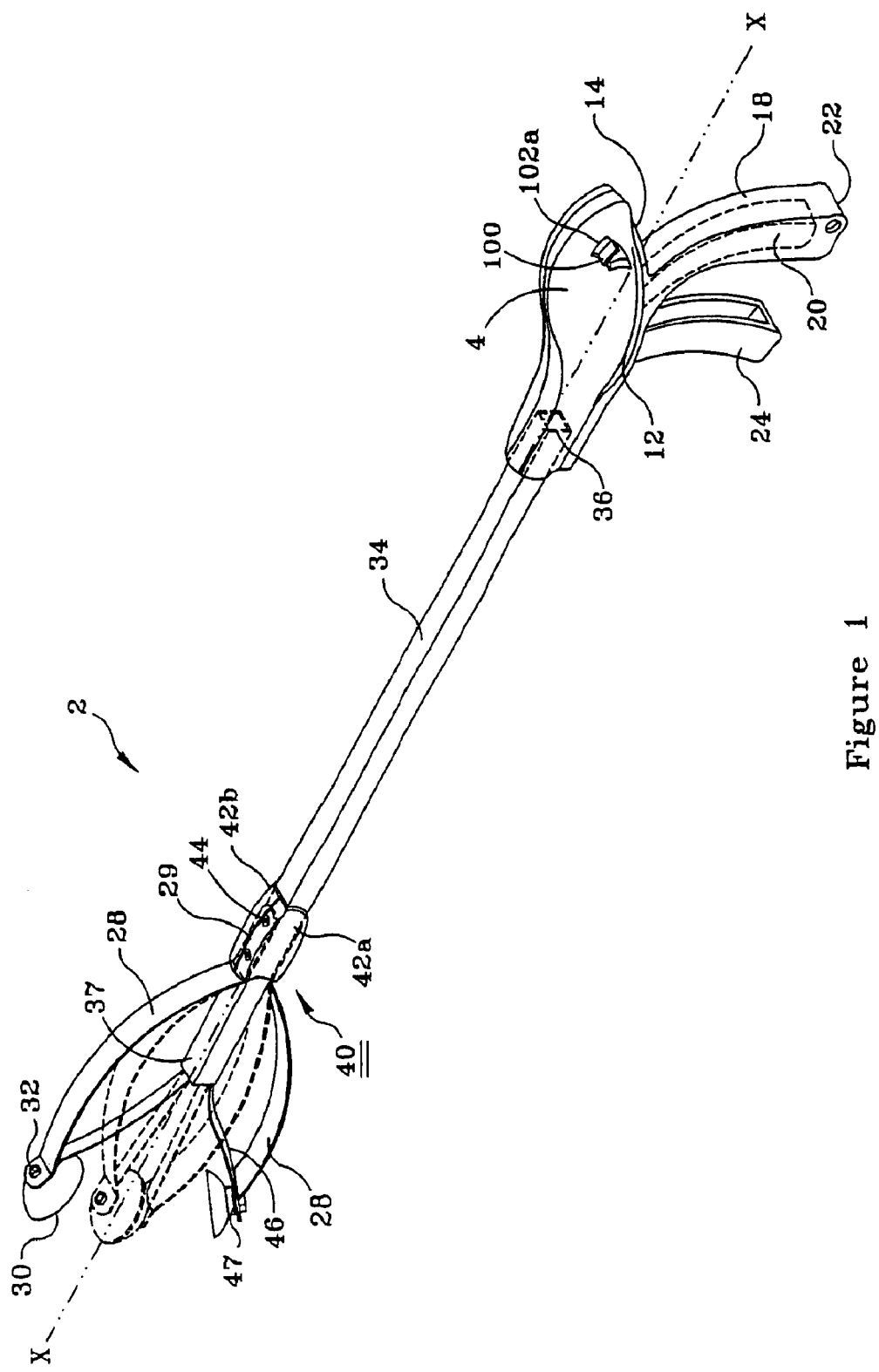
FIG. 1 is a perspective view of the preferred embodiment of this invention.
Figure 2:
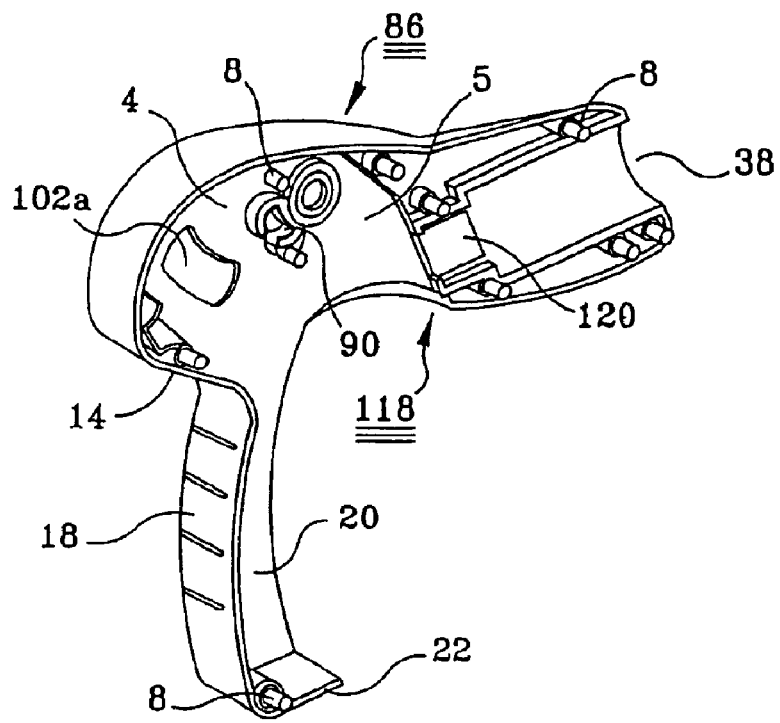
FIG. 2 is an illustrative, cross-sectional view of one panel of the tool body of the invention, showing the interior thereof with assembly pins formed thereon.
Figure 3:
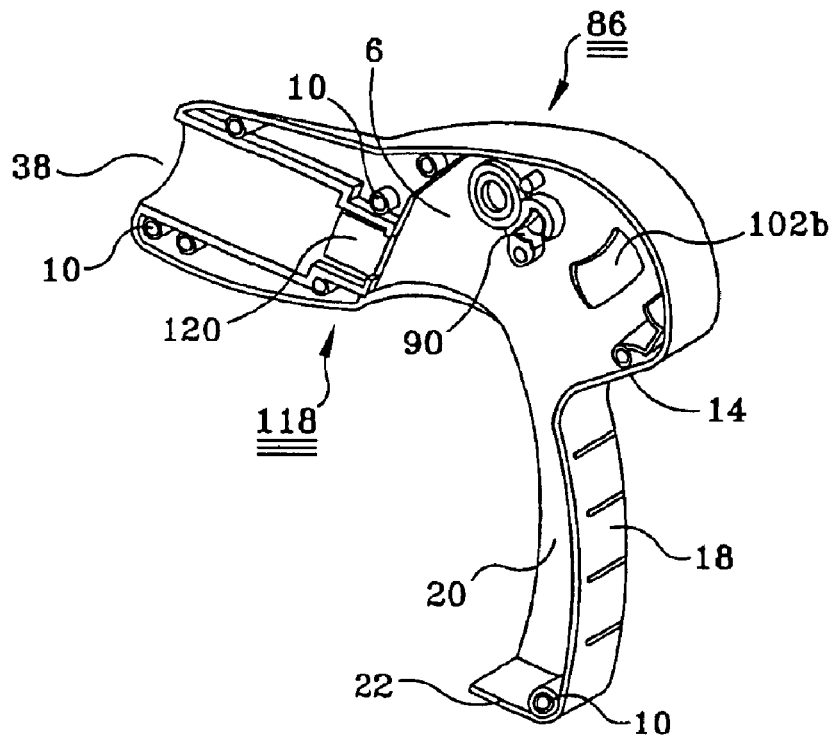
FIG. 3 is an illustrative, cross-sectional view of the other panel of the tool body, showing the interior thereof with assembly pin-receiving receptacles.

Turning now to the drawings where elements or limitations are identified with numbers and like elements or limitations are identified with like numbers throughout the ten figures, the preferred embodiment of the invention is shown in FIGS. 1–3 and shows a hand-held tool 2 for grasping items located at a distance from an operator. Tool 2 comprises a hollow body 4, preferably made of a light-weight plastic, and formed by at least two attachable side panels 5 and 6. A plurality of assembly pins 8, preferably molded thereon, and formed on the inside of side panel 5, is received by a plurality of aligned, assembly pin-receiving receptacles 10 on the inside of side panel 6, for attaching side panels 5 and 6 together. Body 4 has a pair of outwardly extending bulging ribs 12, one on each side panel, to provide a support area for the thumb of the operator when operator holds tool 2.

As shown in FIGS. 1, 2, and 3, a handle 18, preferably slender, for holding by either hand of the operator and for manipulating tool 2, extends downwardly from a lower rear portion 14 of body 4. Handle 18 may have a recess 20 formed in the front thereof and is terminated at the bottom by end 22.

Figure 4:
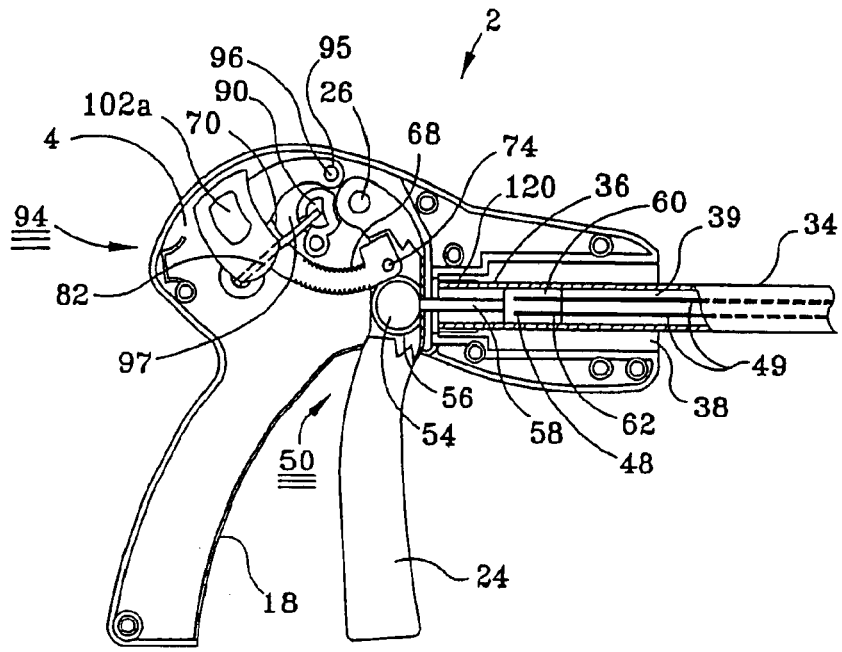
FIG. 4 is an illustrative, cross-sectional, side view of the tool body, handle and trigger.

As shown in FIGS. 1 and 4, a squeezable trigger 24 extends downward from tool body 4, forward of handle 18 and pivotally apart therefrom and is operably arranged with handle 18. Trigger 24 pivots about a first pin 26, preferably located within hollow body 4 as it is squeezed and released.

As shown in FIG. 1, tool 2 of this invention further includes at least one, but preferably two, movable, pickup fingers 28 in bias-apart arrangement, for aiding in grasping the item in response to squeezing trigger 24. Moveable, pickup fingers 28, having inner terminal ends 29, are preferably mounted symmetrical about a central axis (x—x), and fingers 28 are preferably of the same length, each extending outwardly into a biased, wide-open position when trigger 24 is in a position furthest away from handle 18. Fingers 28 move under bias pressure toward each other for grasping the item when trigger 24 is squeezed, and move away from each other for releasing the item when trigger 24 is released. It is preferred that trigger 24 pivots from a first position, widest apart from handle 18, with fingers 28 in the widest-apart position, into a second position, closer toward handle 18, with fingers 28 in a position closer toward each other. Trigger 24 may further partially or completely collapse inside recess 20 in handle 18, with fingers 28 in a position even closer toward each other. Movement of fingers 28 can take place in any orientation about the plane of handle 18 and trigger 24, but it is preferred that fingers 28 operate in an arrangement parallel or perpendicular to the plane of handle 18 and trigger 24. Moveable fingers 28 are further terminated at their distal ends by a pair of suction cups 30 attached thereto by a nut-and-bolt arrangement 32, for providing a better grip about the item.

As shown in FIGS. 1 and 4, an elongated, rigid member 34, defined by a first terminal end 36 and a spaced-apart second terminal end 37, is attached between tool hollow body 4 and moveable, pickup fingers 28. Rigid member 34 holds body 4 and moveable fingers 28 in a spaced-apart, rigid configuration, and is of a length sufficient to allow the operator to grasp an item at a distance from the operator. The length of rigid member 34 is limited to the overall weight of tool 2 that is comfortable for use by a person. First terminal end 36 of rigid member 34 enters tool body 4 through a central opening 38 at front portion of body 4. Rigid member 34 preferably is a hollow shaft 39 that has a square or other geometric cross-sectional shape and made of a light-weight metal such as aluminum or titanium. Inner ends 29 of moveable, pickup fingers 28 are preferably mounted on opposite sides of the exterior surface of hollow shaft 39 toward second terminal end 37 by a clamp means 40. It is preferred that moveable fingers 28 extend outwardly beyond second terminal end 37.

As shown in FIG. 1, clamp means 40 includes two sleeves 42a and 42b assembled together by a plurality of assembly pins and rivets 44 for enclosing inner ends 29 of movable, pickup fingers 28 and the exterior of elongated rigid member 34.

As shown in FIGS. 1 and 4, at least one, but preferably two, flexible members 46, are attached between trigger 24 and moveable, pickup fingers 28, for moving the fingers in response to movement of trigger 24. Flexible members 46, each are defined by a first terminal end 47 and a spaced-apart, second terminal end 48, and are preferably, flat, pliable, metal ribbons 49. It is preferred that ribbons 49 are spaced-apart, extending longitudinally within hollow shaft 39 and connectably attach with trigger 24 by a rotator means 50, as seen in FIG. 4. Ribbons 49 extend out of shaft 39 at second terminal end 37 and attach, by ends 47 thereof, to moveable, pickup fingers 28 through nut-and-bolt arrangement 32, one ribbon passing to one of each of two moveable, pickup fingers 28, in a bias relationship therewith, for permitting fingers 28 to move in response to squeezing trigger 24. The length of ribbons 49 is adjusted so that terminal ends 47 extend to their widest, spaced-apart, configuration, when trigger 24 is in its forward-most position and be taut within body 4 to allow moveable, pickup fingers 28 to grasp the item.

Figure 5:
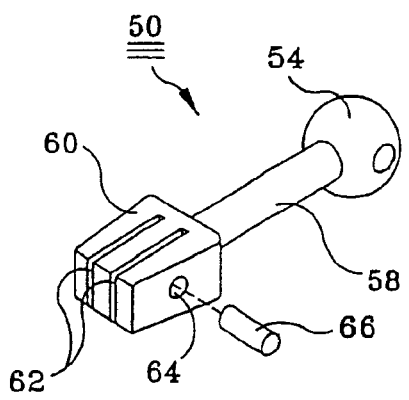
FIG. 5 is a perspective view of the rotator means.

As shown in FIGS. 4 and 5, rotator means 50, arranged inside hollow body 4, includes a ball 54 which is rotatably housed within a spherical socket 56 formed inside trigger 24, and a central shaft 58, terminated by a connector 60. Connector 60 is housed within first terminal end 36 of hollow shaft 39, preferably in a slidable relationship therewith, for receiving therein ribbons 49. It is preferred that a pair of spaced-apart slots 62, formed within connector 60, receives therein the ends 48 of ribbons 49, having a cross-bore 64 and a cross-pin 66, anchoring ends 48 of ribbons 49 to connector 60. Rotator means 50 is adapted for travel fore and aft in tool body 4 as a function of squeezing and releasing trigger 24, and moving ribbons 49 therewith. The bias pressure is achieved by the pulling of ribbons 49 toward handle 18 when trigger 24 is squeezed. As a result, when trigger 24 is squeezed, moveable, pickup fingers 28 are forced to move toward each other.

Figure 6:
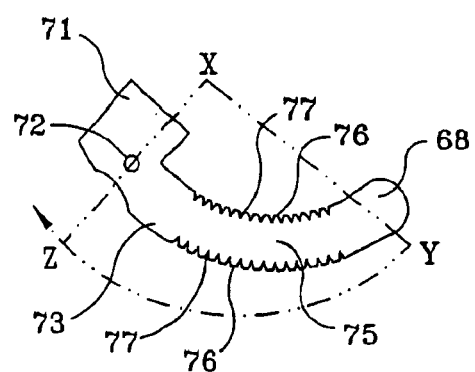
FIG. 6 is a side view of the lockable element.
Figure 7:
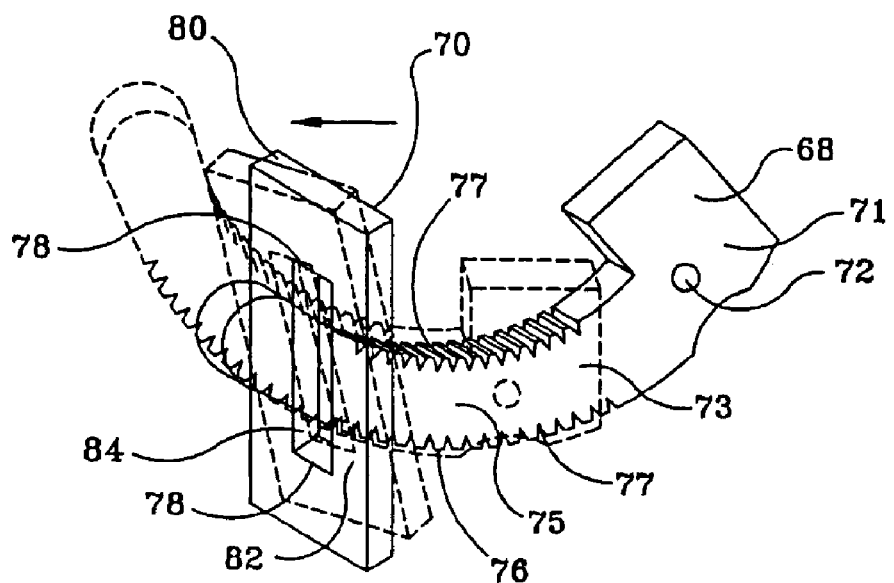
FIG. 7 is a perspective view of the lockable element and the binding plate, showing the interaction between them.

As shown in FIGS. 4, 6 and 7, a pivotal, lockable element 68, preferably housed within hollow tool body 4, interacts with a loosely-arranged, binding element 70 for permitting infinite locking positions for moving fingers 28. Lockable element 68 is defined by a wide end 71, having an aperture 72 therethrough, and a curved bar 73, extending away from wide end 71. Curved bar 73 is asymmetrically curvilinear as shown in FIG. 6. This is distinguished from the symmetrical curve (Y-Z) plotted therewith, also shown in FIG. 6, where the radiuses (X-Y) and (X-Z) are shown being of equal length. A second pin 74 attaches lockable element 68 to trigger 24 through aperture 72. It is preferred that lockable element 68 is made of a solid, strong metal. Bar 73 and its surface 75 have at least one, but preferably two, spaced-apart contact surfaces 76 which provide different interacting positions for binding plate 70. In the preferred embodiment, contact surfaces 76 are roughened to increase the friction between either or both of the surfaces with one or both surfaces surrounding apertures 84 that are formed in binding element 70. More particularly, this roughened surface may take the form of a plurality of small, serrated or saw-like teeth 77 formed cross-ways along surfaces 76 as shown in FIGS. 6 and 7.

As shown in FIGS. 4 and 7, loosely-arranged binding plate 70, is preferably housed within hollow body 4, and presents at least one, but preferably two, working edges 78 for interacting with lockable element 68 for permitting infinite locking positions for moveable fingers 28 against the item grasped by the fingers. It is preferred that binding plate 70 is in the shape of an A-frame, and defined by a top portion 80, a pair of spaced-apart side leg members 82, and an aperture 84 formed therebetween. Aperture 84, having at least one, preferably two, flat, working edges 78, receives lockable element 68 which passes therethrough. Upon actuation, binding plate 70 moves along curvilinear surface 75 of bar 73 permitting its working edges 78 to slide into at least one serrated indentation 77 to achieve a lock position. Serrated teeth 77 provide the multiple locking positions as binding plate 70 slides into contact with any one, preferably both of them, depending on the size of the item picked up. As shown in FIGS. 3 and 4, binding plate 70 is loosely pivoted within body 4 by a pivotal means 86. Pivotal means 86 is a pivotal-functioning recess 90 for loosely receiving top portion 80 of binding plate 70.

Figure 8:
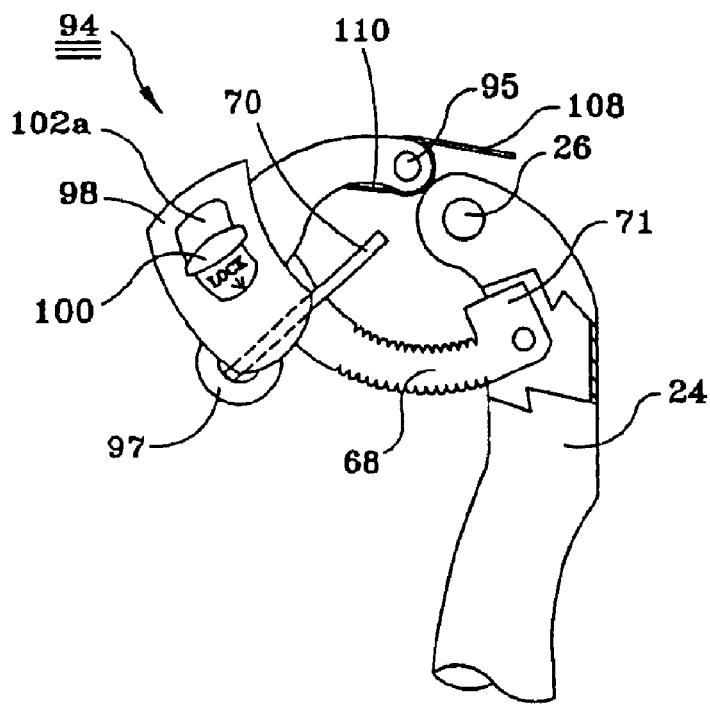
FIG. 8 is a side view of the trigger, lockable element and binding element, showing the spatial relationship between them as they would be arranged within the tool body.
Figure 9:
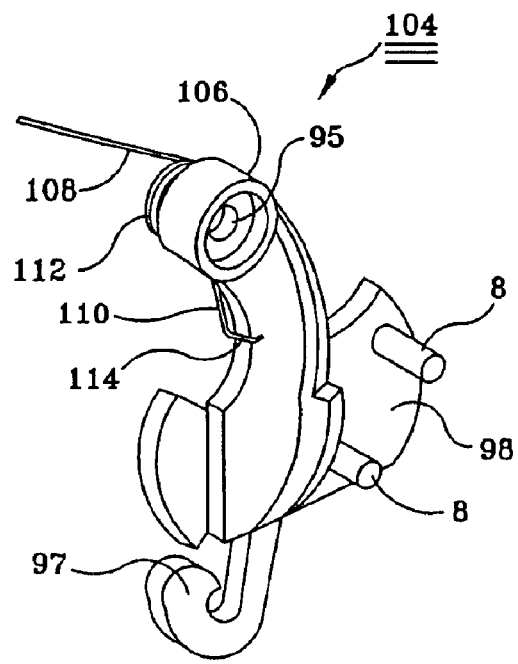
FIG. 9 is a perspective of the torque spring showing its relationship to the actuator means, specifically, to one of the actuator plates; and, FIG. 10 is an illustrative side view of the wrist band attached to the handle showing how a person can use it.

As shown in FIGS. 4, 8, and 9, an actuator means 94 is provided for actuating binding plate 70, by causing plate 70 to move in a forward direction, and, as a result, locking working edges 78 of plate 70 in various locking positions against lockable element 68, preferably within at least one of said small, serrated teeth 77 depending on the size of the picked-up item. Actuator means 94 is pivotally mounted inside tool body 4 and has an aperture 95 therethrough for receiving a third pin 96. Third pin 96 is arranged spaced-apart from first pin 26 within hollow body 4. Actuator means 94 is located inside hollow body 4 and allows lockable element 68 to swing through its entire path when trigger 24 is squeezed. Also included is a cross-plate 97 and a pair of spaced-apart actuator plates 98 (only one actuator plate being shown) that are assembled together by a plurality of assembly pins 8, assembly pin-receiving receptacles 10 molded onto the inside of plates 98, and a pair of buttons 100 (only one button being shown) formed externally thereon. Cross-plate 97 unrestrainably holds leg members 82 of binding plate 70, each leg member extending on each side of cross-plate 97. Buttons 100 extend through a pair of twin windows 102a and 102b, shown also in FIGS. 2 and 3, one located on each side of tool body 4, and are adapted to be moved into a locked position by the thumb of the operator. When exposed button 100 is pushed into the locked position by the thumb, cross-plate 97 pushes attached leg members 82 of binding plate 70 in a forward direction which causes top portion 80 to loosely pivot in an opposite direction within a pivotal-functioning recess 90, shown in FIG. 4. The distance traveled by top portion 80 within recess 90 is shorter than the distance traveled by leg members 82. The working edges 78 of binding plate 70 within aperture 84, wedge in a temporary locked position within at least one, but preferably two of the serrated teeth 77, at different positions along lockable bar 73 depending on the size of the item picked-up. In a locked position, moveable fingers 28 secure their grip around the picked-up item, and the item is held in the locked position for a period of time without the operator having to exert any physical effort of the hand and fingers to hold the item in this position. Binding plate 70 easily is freed from the locked position by a slight squeezing of trigger 24, causing binding plate 70 to unlock its position against lockable bar 73 and returning to its original, unlocked position, further causing actuator means 94 to return to its original, unlocked position, permitting trigger 24 to return to its original position furthest away from handle 18, and further permitting fingers 28 to return to their original, wide-open position.

A bias means 104 is provided to aid actuator means 94 to return from its locked position, to its original, unlocked position. As shown in FIGS. 8 and 9, bias means 104 is a torque or torsion spring 106 having a first leg 108 and a second leg 110 extending outward at an angle to each other from a center torque-twist 112. It is preferred that central torque-twist 112 is coiled around third pin 96 that also receives actuator means 94 through actuator aperture 95. Sharing the same pin permits the saving of space inside hollow body 4 and the positioning of torque spring 106 in close proximity to actuator means 94 for an operable, bias relationship therebetween. Second leg 110 terminates in a bent portion 114 that encompasses a portion, preferably a front portion, of actuator means 94. When exposed button 100 is pushed forwardly, actuator means 94 pushes bent portion 114 of spring 106 also forwardly in a bias relationship therewith. The bias relationship is achieved by second leg 110 being pushed forward under bias pressure. When binding plate 70 is released from its locked position about lockable curved bar 73, upon the slight squeezing of trigger 24, the bias pressure of spring 106 is released and second leg 110 swiftly springs back into its original position and moving actuator means 94 therewith to its original position. Other bias means may be used such as a coil spring or a leaf spring.

As shown in FIGS. 2 and 3, a socket means 118 in tool body 4 receives hollow shaft 39 in a removable relationship therewith. Socket means 118 includes a socket 120 that has the same shape and size as the external shape and size of hollow shaft 39. Shaft 39 is adapted to be pulled out of socket 120 against the spring bias while shaft 39 still houses connector 60 in a slidable relationship therewith. Shaft 39 is turned clockwise or counter-clockwise, and is repositioned in socket 120 to accomplish the change in the plane of moveable fingers 28. Repositioning may take place into a wide variety of positions, but it is preferred that repositioning takes place into four positions, i.e., 90 degrees, 180 degrees, 270 degrees, and 360 degrees. If shaft 39 is made to have a greater or lesser number of sides and socket 120 is made in a geometric design similar thereto, then the plane may be rotated in any other angles, depending on the number of sides. Rotational ball 54 within trigger 24 permits the turning of the connector-receiving shaft 39 into the various positions about the shaft's central axis.

Figure 10:
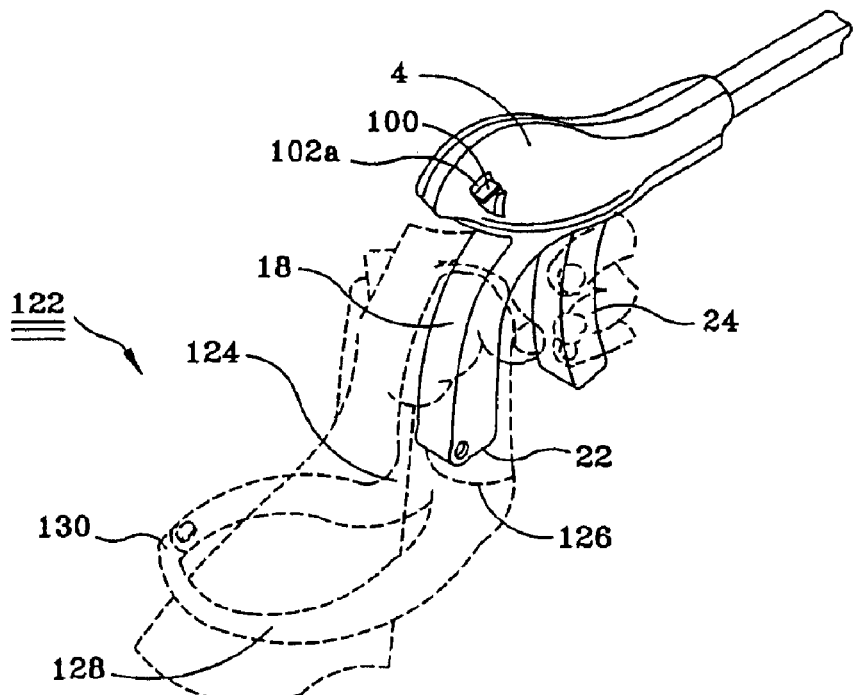

FIG. 10 shows a modification to tool 2 comprising a wrist support means 122 for aiding an operator in holding tool 2. Wrist support means 122 includes a base 124 formed at a first end 126, for covering the bottom end 22 of handle 18. Base 124 has a plurality of pins 8, preferably molded thereon, for attaching into a pair of aligned, pin-receiving receptacles 10, formed on handle 18. A dished-extension 128 expands rearward from first end 126, with a slight "S" shape, to a second end 130. Wrist support means 122 is designed for use by those persons having reduced strength in their wrists, whether caused by old-age, an accident, or disease, such as arthritis, the "S" shape conforming to the bottom of the hand holding tool 2. To use support means 122, one merely clips the wrist support means 122 to handle 18 at the pin-and-receptacle arrangement, for fastening support means 122 to handle 18. When the operator grasps handle 18, support means 122 provides sustained bracing to the juncture between the operator's hand and tool handle 18 while simultaneously by-passing the articulation of the operator's wrist and providing support directly from the operator's forearm. Wrist support means 122 may be snapped onto handle 18 as needed by user, or may be glued or otherwise affixed to handle 18 permanently. Wrist support means 122 may also be pivoted upward adjacent handle 18 when not in use as shown in dotted outline in FIG. 10.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A hand-held tool, for grasping items located at a distance from the operator comprising:
   a tool body, including a handle extending therefrom, for holding by the operator, and a moveable trigger operably arranged with said handle;
   a first movable, pickup finger, for aid in grasping an item in response to squeezing said trigger;
   a second movable pickup finger for aiding in grasping an item in response to squeezing said trigger;
   a first, elongated, rigid member, attached between said tool body and said a first moveable finger and said second moveable pickup finger, for holding said tool body and said a first moveable and said second movable pickup finger, in a spaced-apart arrangement;
   a second pair of flexible members attached between said trigger and said a first moveable finger, for moving said finger in response to movement of said trigger;
   a lockable element wherein said movable, pickup finger may be locked in a plurality of positions between a fully closed position and a fully open position;
   a loosely-arranged binding plate, moveable by the thumb of the hand holding said handle, arranged for movement against said lockable element for permitting infinite locking positions of said a first movable finger against the item grasped by said finger; and,
   a socket means in said tool body for receiving said first, rigid, elongated member, said first, elongated, rigid member being adapted to be pulled out of said socket means and be turned in any arrangement about said elongated, rigid member's central axis, for operating said attached a first moveable finger, in a plurality of axes in relation to the plane of said handle.

2. The hand-held tool of claim 1 wherein said tool body is hollow.

3. The hand-held tool of claim 1 wherein said a first moveable, pickup finger is spring-loaded to move for picking up and releasing the item, said a first moveable, pickup finger is attached to said first, elongated, rigid member.

4. The hand-held tool of claim 1 wherein said tool further includes:
   said first pickup finger and said second pickup finger arranged to be spring-loaded to move toward and apart from each other for picking up and releasing the item;
   wherein said first pickup finger and said second pickup finger are attached to said first, elongated, rigid member.

5. The hand-held tool of claim 1 wherein said tool further includes:
   said pair of flexible members attached between said trigger and said first pickup finger and said second pickup finger;
   said pair of flexible members biased apart by said first pickup finger and said second pickup finger.

6. The hand-held tool of claim 1 wherein said first, elongated, rigid member, is a hollow shaft.

7. The hand-held tool of claim 1 wherein the pair of flexible members are flat, flexible, metal ribbons.

8. The hand-held tool of claim 1 wherein said lockable element is attached to said trigger within said tool body, said lockable element is curved to present a non-symmetrical, curvilinear surface having a first contact surface for providing variable, lockable, interacting positions to said binding plate, said lockable, interacting positions of said lockable element further permitting infinite, variable, locking positions of said first pickup finger and said second pickup finger against the item grasped by said fingers.

9. The hand-held tool of claim 8 wherein said at least one contact surface of said lockable element having formed therein at least one roughened surface for frictional engagement with the edges of a plurality of apertures in said binding plate to provide multiple locking positions of said first and second movable, pickup fingers against the item grasped by said fingers.

10. The hand-held tool of claim 9 wherein a non-symmetrical, curvilinear surface of said lockable element has two contact surfaces, wherein said at least one roughened surface contains a plurality of small, serrated teeth formed therealong.

11. The hand-held tool of claim 1 wherein said socket means includes a socket having the same shape and size as the external shape and size of said first, elongated, rigid member.

12. A hand-held tool, for grasping items located at a distance from the operator, comprising:

a hollow tool body, including a handle extending therefrom, for holding by the operator, and a pivotally-mounted, finger-actuated trigger in biased relationship with said handle; two moveable, pickup fingers for aid in grasping an item under bias pressure, in response to squeezing said trigger;

an elongated, rigid, hollow member having a first terminal end, said rigid, hollow member being attached between said hollow tool body and said two moveable, pickup fingers for holding said tool body and said two, moveable, pickup fingers in spaced-apart arrangement;

two, elongated, flexible members extending within said hollow member, said flexible members being attached to said trigger and said two moveable, pickup fingers for moving said fingers in response to movement of said trigger;

a lockable element housed within said hollow tool body and attached to said trigger to pivotally move when said trigger is squeezed and further wherein said lockable element has a plurality of lockable positions within the hollow tool body;

an actuator means pivotally-mounted within said hollow tool body;

a loosely-arranged binding plate attached within said hollow tool body by a pivotal means, said binding plate having formed therein an aperture surrounded in part by one or more contact surfaces arranged to be placed by said actuator means in temporary, lockable, interacting positions with said lockable element for permitting multiple, variable, locking positions of said two movable pickup fingers against the item grasped by said fingers;

a socket means in said tool body for receiving said first terminal end of said rigid, elongated, hollow member in a removable relationship therewith, said elongated, rigid, hollow member being adapted to be pulled out of said socket means and be turned in any position about said member's central axis for operating said moveable fingers in any plane with the plane of said elongated, rigid, hollow member; and, a bias spring means arranged in said tool body for aiding said actuator means to move pivotally within said tool body.

13. The hand-held tool of claim 12 wherein said two, moveable, pickup fingers are oppositely mounted to said elongated, rigid, hollow member, said moveable, pickup fingers further being arranged in a plane parallel with the plane of said handle.

14. The hand-held tool of claim 12 wherein said two, moveable, pickup fingers are arranged in a plane perpendicular with the plane of said handle.

15. The hand-held tool of claim 12 wherein said two, moveable, pickup fingers are spring-loaded to move together to grip the item to be picked up, said spring-loaded fingers moving apart to release the picked-up item.

16. The hand-held tool of claim 12 wherein said two, flexible members are flat, flexible, metal ribbons.

17. The hand-held tool of claim 12 wherein said flexible members are ribbons attached to said trigger through a rotator means, said rotator means including a ball, housed within a spherical socket within said trigger, a central shaft, and a connector, having slots formed there through for receiving said ends of said ribbons, said connector further housed within said terminal end of said shaft in a slidable relationship therewith.

18. The hand-held tool of claim 17 wherein said at least one contact surface has formed therein a plurality of serrated indentations for receiving said binding plate to provide infinite locking positions of said pair of movable, pickup fingers against the item grasped by said fingers.

19. The hand-held tool of claim 17 wherein a non-symmetrical, curvilinear surface of said lockable element has two contact surfaces, each having formed crossways therealong a plurality of small, serrated teeth for mating contact with one or more surfaces formed about said aperture in said binding plate.

20. The hand-held tool of claim 17 wherein said actuator means includes:

a pivotal means;

a cross-plate;

a pair of actuator plates; and, a button, formed on each of said actuator plates, said button extending outwardly from said body, and accessible from each side of said handle, of which one is moved by the thumb of the hand holding said handle, into a locking position with said lockable element.

21. The hand-held tool of claim 12 wherein said binding plate is shaped in an A-frame having a top portion and a pair of leg members, said pivotal means of said binding plate including an open recess for loosely receiving said top portion of said binding plate, said leg members being loosely attached to said cross-plate of said actuator means.

22. The hand-held tool of claim 12 wherein said handle having a wrist support means for aiding a user in holding said tool that pivots into upright position against the handle of said tool for storage when not in use.

23. The hand-held tool of claim 12 wherein said movable, pickup fingers each further terminates by a pair of suction cups for aiding in picking up of the item.

24. The hand-held tool of claim 12 wherein said bias spring means includes a torque spring having a first leg and a second leg extending outward at an angle to each other from a center torque-twist wherein said second leg terminates in a bent portion that encompasses a portion of said actuator means for permitting an operable, bias relationship therebetween.

25. A hand held tool, for grasping items located at a distance from the operator comprising:

a tool body, including a handle extending therefrom, for holding by the operator, and a moveable trigger operably arranged with said handle;

a pair of moveable pickup fingers, for aid in grasping an item in response to squeezing said trigger;

a first, elongated, rigid member, attached between said tool body and said a pair of moveable pickup fingers, for holding said tool body and said a pair of moveable pickup fingers, in a spaced-apart arrangement;

a second, flexible member attached between said trigger and said a pair of moveable fingers, for moving said fingers in response to movement of said trigger;

a lockable element wherein said movable, pickup fingers may be locked in a plurality of positions between a fully closed position and a fully open position;

a loosely-arranged binding plate, moveable by the thumb of the hand holding said handle, arranged for movement against said lockable element for permitting infinite locking positions of said a pair of moveable pickup fingers against the item grasped by said fingers;

a socket means in said tool body for receiving said first, rigid, elongated member, said first, elongated, rigid member being adapted to be pulled out of said socket means and be turned in any arrangement about said elongated, rigid member's central axis, for operating the a pair of moveable pickup fingers, in a plurality of axes in relation to the plane of said handle;

said pair of moveable, pickup fingers arranged to be spring-loaded to move toward and apart from each other for picking up and releasing the item; and wherein said pair of moveable, pickup fingers are attached to said first, elongated, rigid member.

26. A hand held tool, for grasping items located at a distance from the operator comprising:

a tool body, including a handle extending therefrom, for holding by the operator, and a moveable trigger operably arranged with said handle;

at least one movable, pickup finger, for aid in grasping an item in response to squeezing said trigger;

a first, elongated, rigid member, attached between said tool body and said at least one moveable finger, for holding said tool body and said at least one moveable finger, in a spaced-apart arrangement;

a second pair of flexible members attached between said trigger and said at least one moveable finger, for moving said finger in response to movement of said trigger;

a lockable element wherein said movable, pickup finger may be locked in a plurality of positions between a fully closed position and a fully open position;

a loosely-arranged binding plate, moveable by the thumb of the hand holding said handle, arranged for movement against said lockable element for permitting infinite locking positions of said at least one movable finger against the item grasped by said finger;

a socket means in said tool body for receiving said first, rigid, elongated member, said first, elongated, rigid member being adapted to be pulled out of said socket means and be turned in any arrangement about said elongated, rigid member's central axis, for operating the at least one moveable finger, in a plurality of axes in relation to the plane of said handle;

said pair of flexible members attached between said trigger and said at least one moveable, pickup finger; and said pair of flexible members biased apart by said at least one moveable, pickup finger.

27. A hand held tool, for grasping items located at a distance from the operator comprising:

a tool body, including a handle extending therefrom, for holding by the operator, and a moveable trigger operably arranged with said handle;

at least one movable, pickup finger, for aid in grasping an item in response to squeezing said trigger;

a first, elongated, rigid member, attached between said tool body and said at least one moveable finger, for holding said tool body and said at least one moveable finger, in a spaced-apart arrangement;

a second pair of flexible members attached between said trigger and said at least one moveable finger, for moving said finger in response to movement of said trigger;

a lockable element wherein said movable, pickup finger may be locked in a plurality of positions between a fully closed position and a fully open position;

a loosely-arranged binding plate, moveable by the thumb of the hand holding said handle, arranged for movement against said lockable element for permitting infinite locking positions of said at least one movable finger against the item grasped by said finger;

a socket means in said tool body for receiving said first, rigid, elongated member, said first, elongated, rigid member being adapted to be pulled out of said socket means and be turned in any arrangement about said elongated, rigid member's central axis, for operating the at least one moveable finger, in a plurality of axes in relation to the plane of said handle; and the second pair of flexible members are flat, flexible, metal ribbons.

28. A hand held tool, for grasping items located at a distance from the operator comprising:

a tool body, including a handle extending therefrom, for holding by the operator, and a moveable trigger operably arranged with said handle;

at least one movable, pickup finger, for aid in grasping an item in response to squeezing said trigger;

a first, elongated, rigid member, attached between said tool body and said at least one moveable finger, for holding said tool body and said at least one moveable finger, in a spaced-apart arrangement;

a second, flexible member attached between said trigger and said at least one moveable finger, for moving said finger in response to movement of said trigger;

a lockable element wherein said movable, pickup finger may be locked in a plurality of positions between a fully closed position and a fully open position;

a loosely-arranged binding plate, moveable by the thumb of the hand holding said handle, arranged for movement against said lockable element for permitting infinite locking positions of said at least one movable finger against the item grasped by said finger;

a socket means in said tool body for receiving said first, rigid, elongated member, said first, elongated, rigid member being adapted to be pulled out of said socket means and be turned in any arrangement about said elongated, rigid member's central axis, for operating the at least one moveable finger, in a plurality of axes in relation to the plane of said handle; and said lockable element is attached to said trigger within said tool body, said lockable element is curved to present a non-symmetrical, curvilinear surface having at least one contact surface for providing variable, lockable, interacting positions to said binding plate, said lockable, interacting positions of said lockable element further permitting infinite, variable, locking positions of said at least one moveable, pickup finger against the item grasped by said fingers.

29. A hand held tool, for grasping items located at a distance from the operator comprising:

a tool body, including a handle extending therefrom, for holding by the operator, and a moveable trigger operably arranged with said handle;

at least one movable, pickup finger, for aid in grasping an item in response to squeezing said trigger;

a first, elongated, rigid member, attached between said tool body and said at least one moveable finger, for holding said tool body and said at least one moveable finger, in a spaced-apart arrangement;

a second, flexible member attached between said trigger and said at least one moveable finger, for moving said finger in response to movement of said trigger;

a lockable element wherein said movable, pickup finger may be locked in a plurality of positions between a fully closed position and a fully open position;

a loosely-arranged binding plate, moveable by the thumb of the hand holding said handle, arranged for movement against said lockable element for permitting infinite locking positions of said at least one movable finger against the item grasped by said finger;

a socket means in said tool body for receiving said first, rigid, elongated member, said first, elongated, rigid member being adapted to be pulled out of said socket means and be turned in any arrangement about said elongated, rigid member's central axis, for operating the at least one moveable finger, in a plurality of axes in relation to the plane of said handle; and said at least one contact surface of said lockable element having formed therein at least one roughened surface for frictional engagement with the edges of a plurality of apertures in said binding plate to provide multiple locking positions of said at least one moveable, pickup finger against the item grasped by said fingers.

30. A hand held tool, for grasping items located at a distance from the operator comprising:

a tool body, including a handle extending therefrom, for holding by the operator, and a moveable trigger operably arranged with said handle;

at least one movable, pickup finger, for aid in grasping an item in response to squeezing said trigger; a first, elongated, rigid member, attached between said tool body and said at least one moveable finger, for holding said tool body and said at least one moveable finger, in a spaced-apart arrangement;

a second, flexible member attached between said trigger and said at least one moveable finger, for moving said finger in response to movement of said trigger;

a lockable element wherein said movable, pickup finger may be locked in a plurality of positions between a fully closed position and a fully open position;

a loosely-arranged binding plate, moveable by the thumb of the hand holding said handle, arranged for movement against said lockable element for permitting infinite locking positions of said at least one movable finger against the item grasped by said finger;

a socket means in said tool body for receiving said first, rigid, elongated member, said first, elongated, rigid member being adapted to be pulled out of said socket means and be turned in any arrangement about said elongated, rigid member's central axis, for operating the at least one moveable finger, in a plurality of axes in relation to the plane of said handle; and a non-symmetrical, curvilinear surface of said lockable element has two contact surfaces, wherein at least one roughened surface contains a plurality of small, serrated teeth formed therealong.

* * * * *